April 30, 1940.  F. V. MAYO  2,198,879
LIQUID DISPENSING APPARATUS
Original Filed June 22, 1934　　7 Sheets-Sheet 1
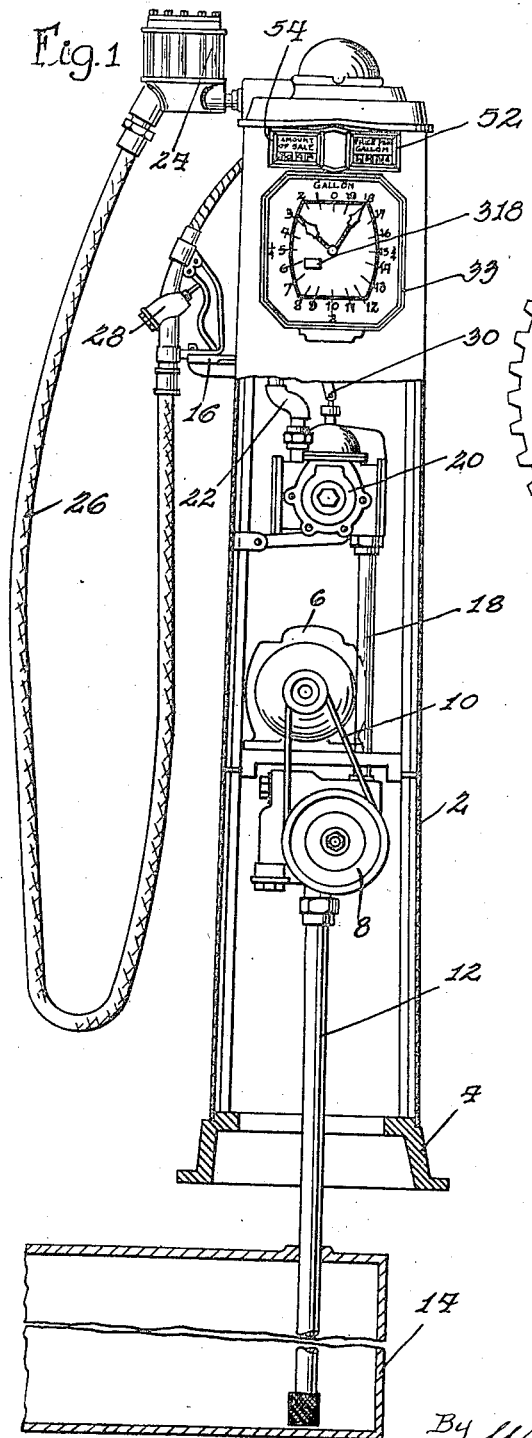
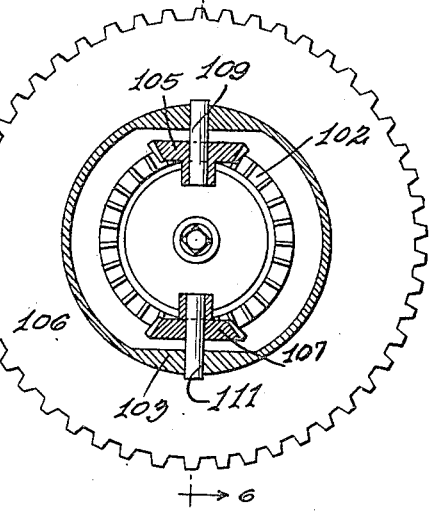
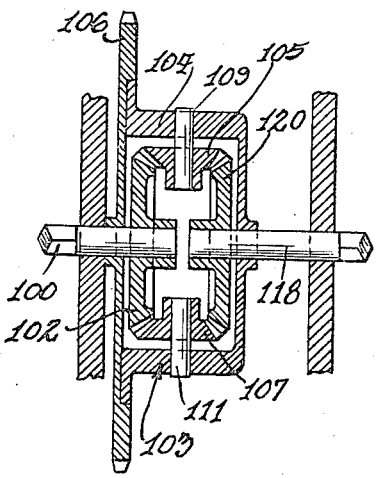
Inventor
Frank V. Mayo,
By Wilkinson Huxley Byron & Knight
Attorneys April 30, 1940.　　　　F. V. MAYO　　　　2,198,879
LIQUID DISPENSING APPARATUS
Original Filed June 22, 1934　　7 Sheets-Sheet 2
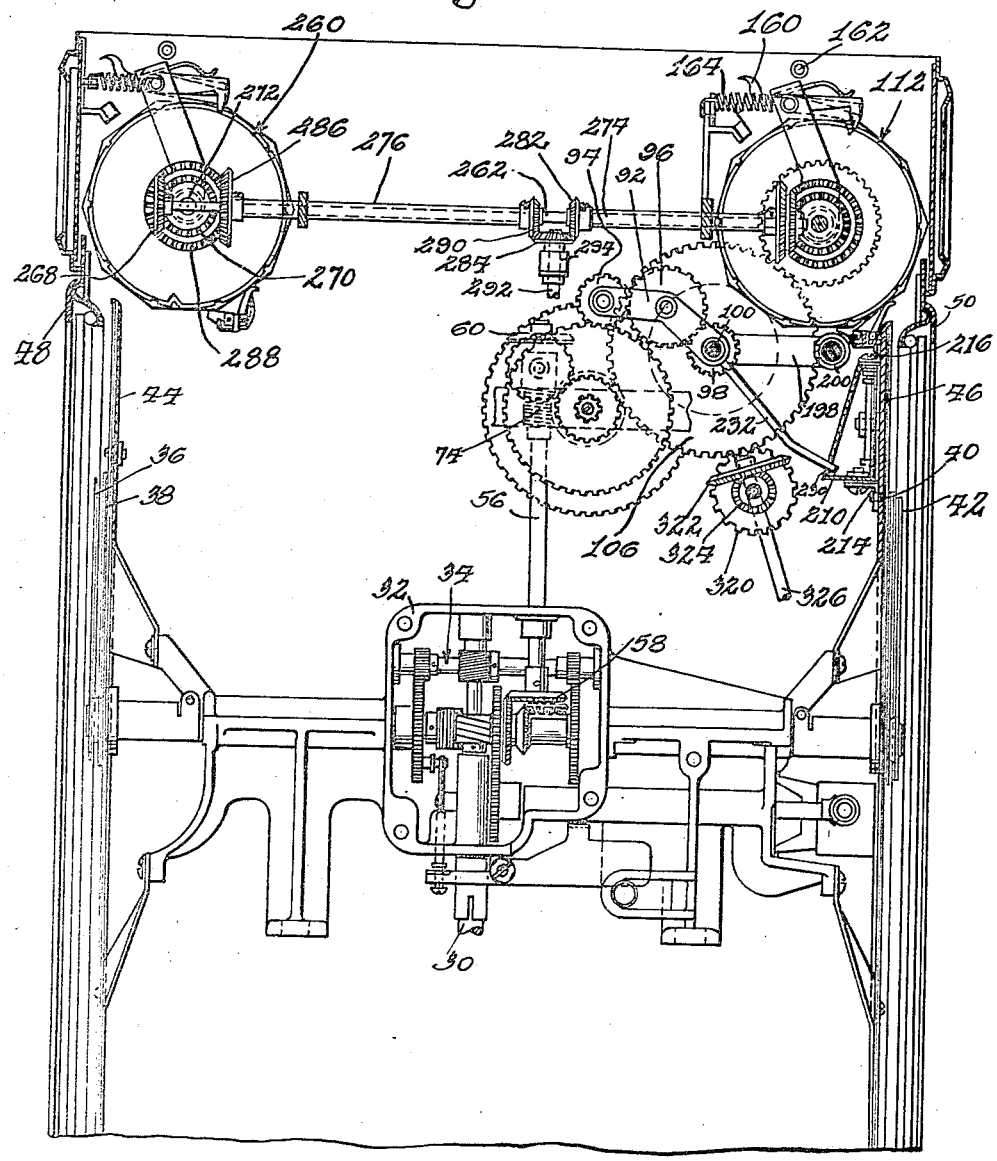
Inventor
Frank V. Mayo
By Wilkinson Huxley Byron & Knight
Attorneys

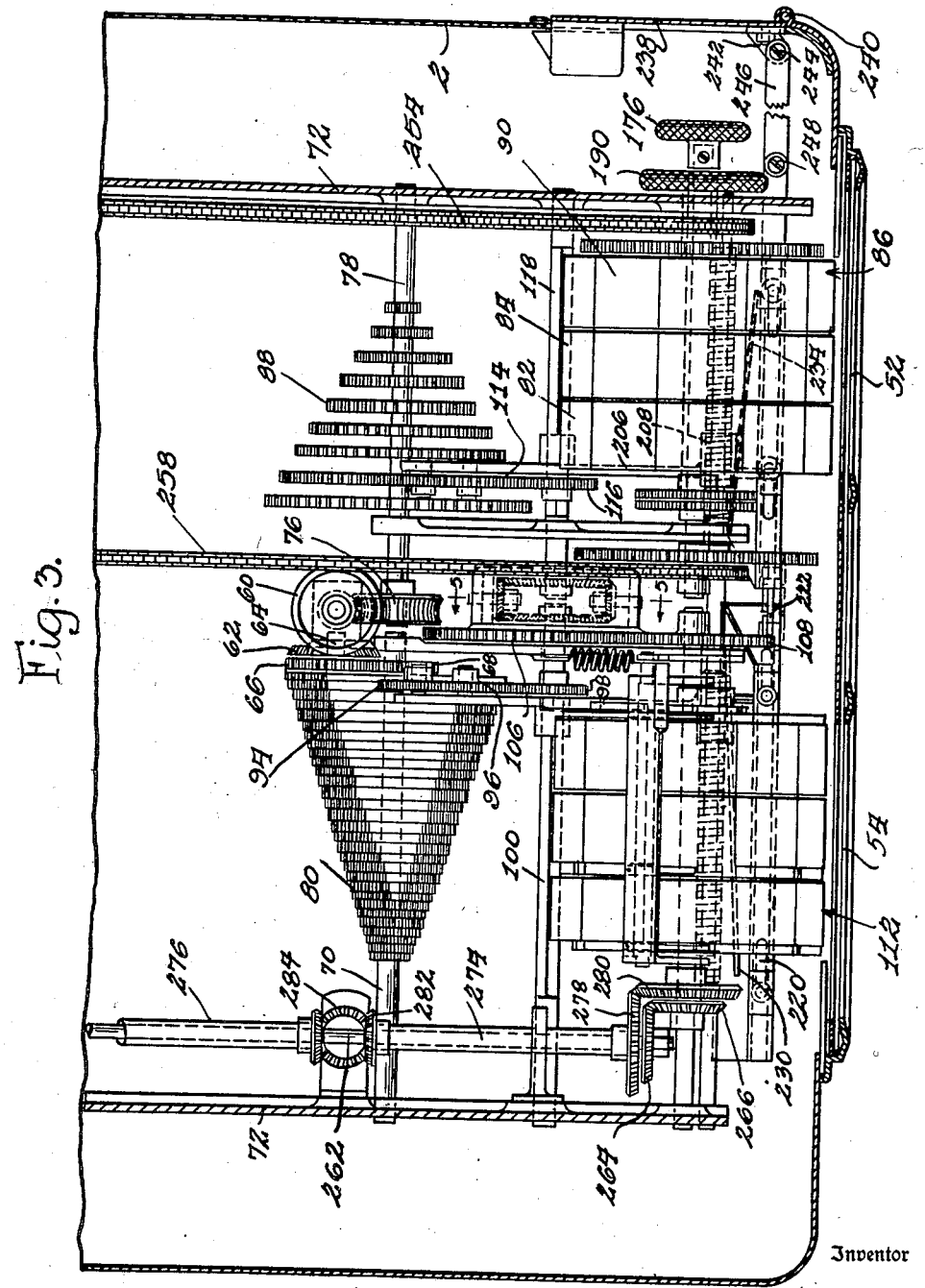

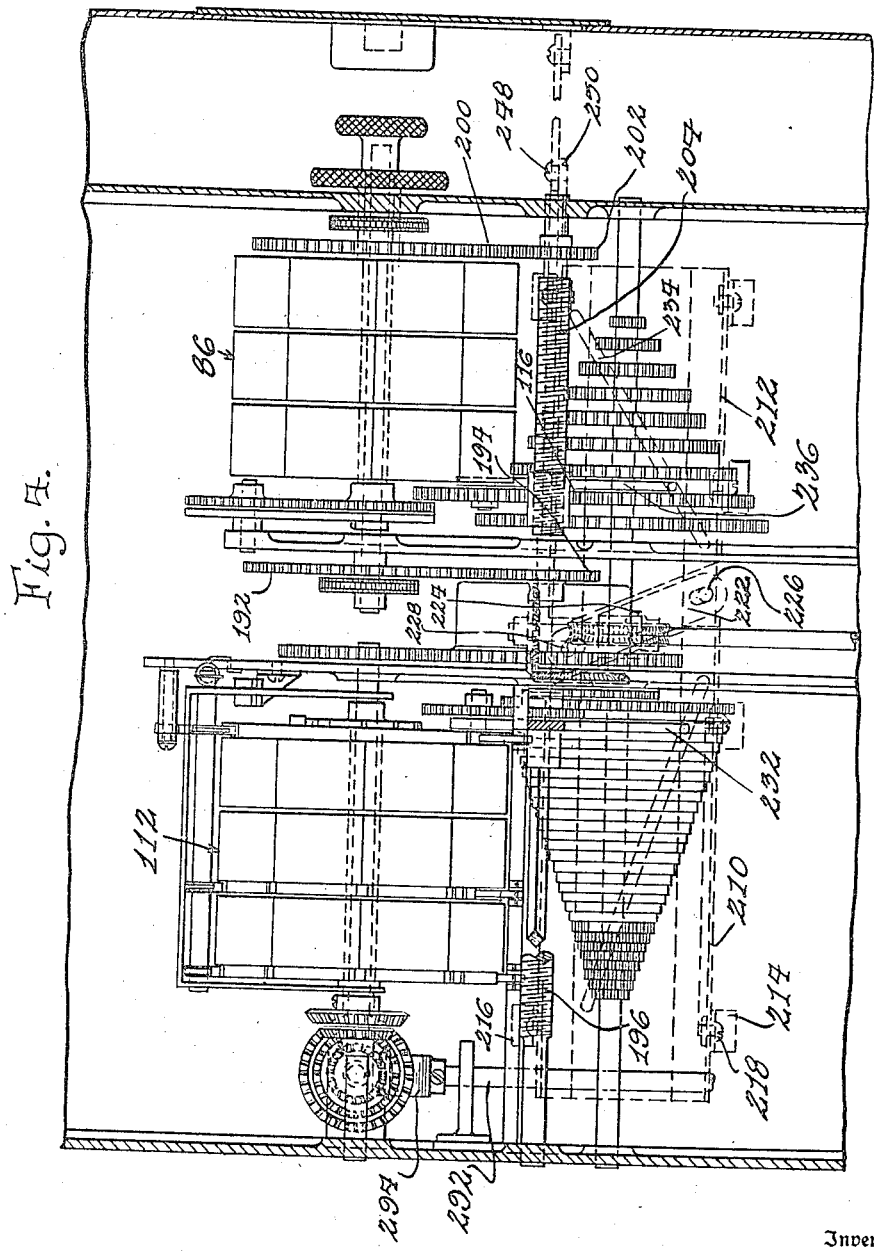

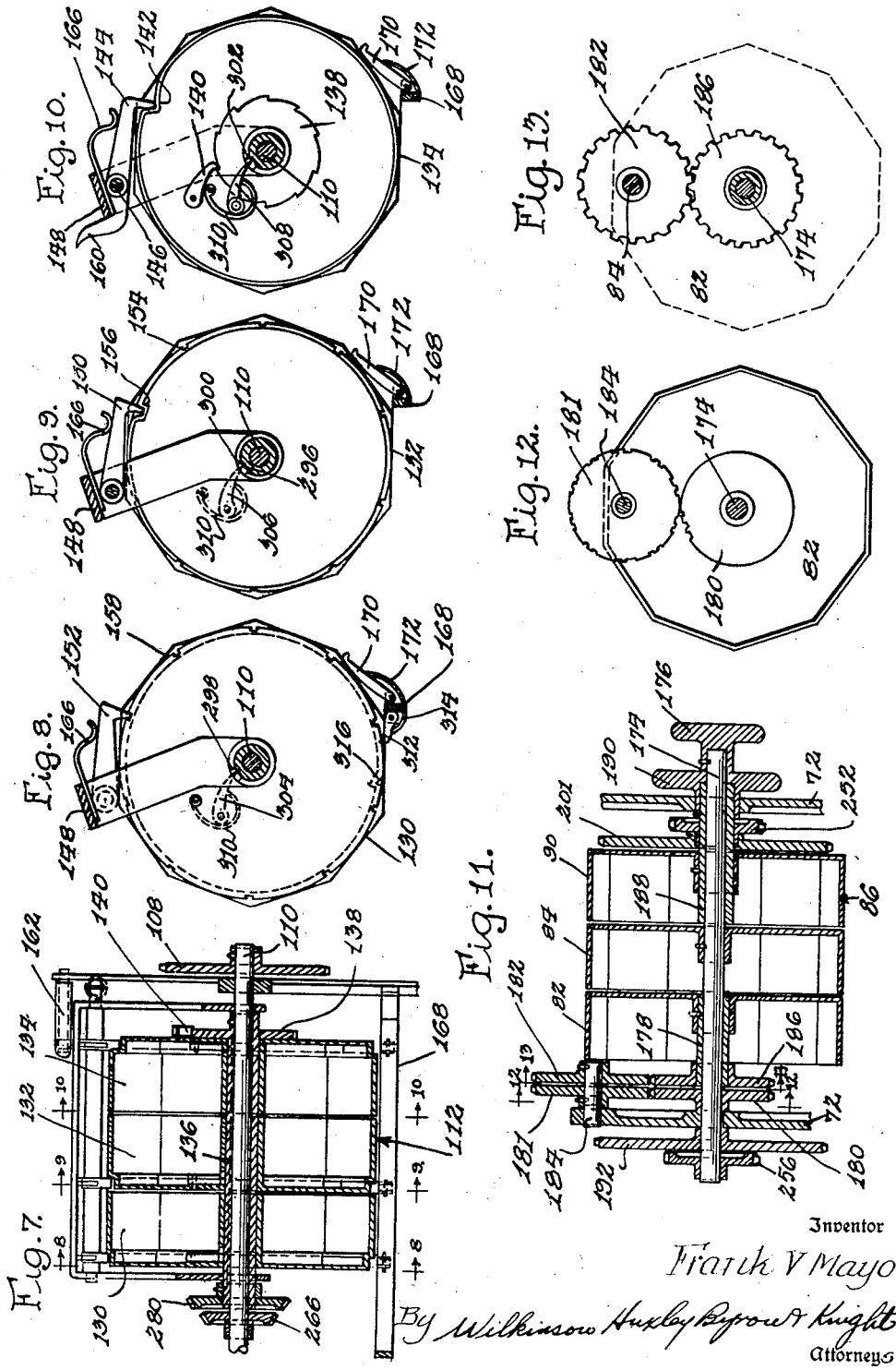

April 30, 1940. F. V. MAYO 2,198,879
LIQUID DISPENSING APPARATUS
Original Filed June 22, 1934 7 Sheets-Sheet 6
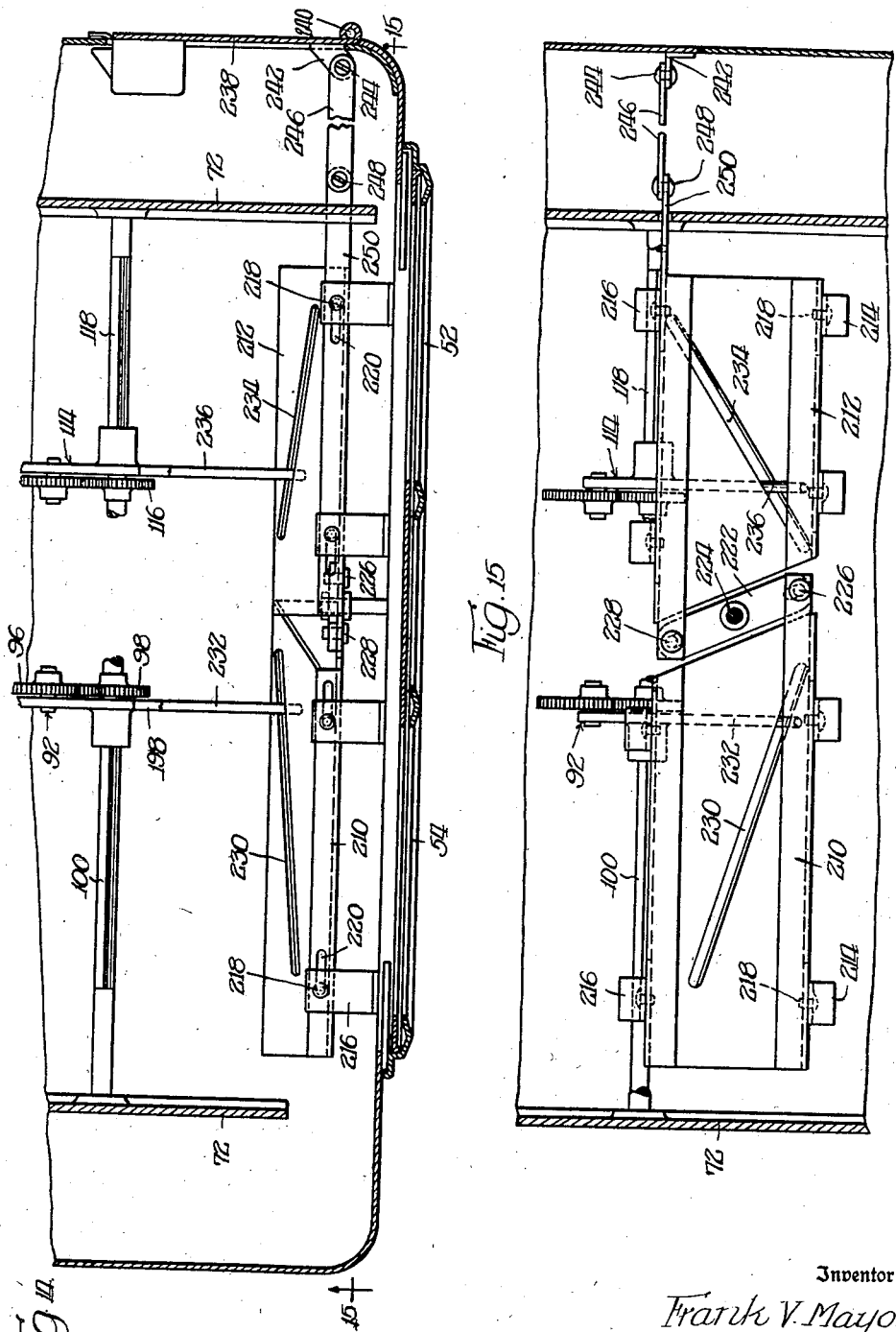
Inventor
Frank V. Mayo.
By Wilkinson Huxley Byron & Knight
Attorneys April 30, 1940.   F. V. MAYO   2,198,879
LIQUID DISPENSING APPARATUS
Original Filed June 22, 1934   7 Sheets-Sheet 7
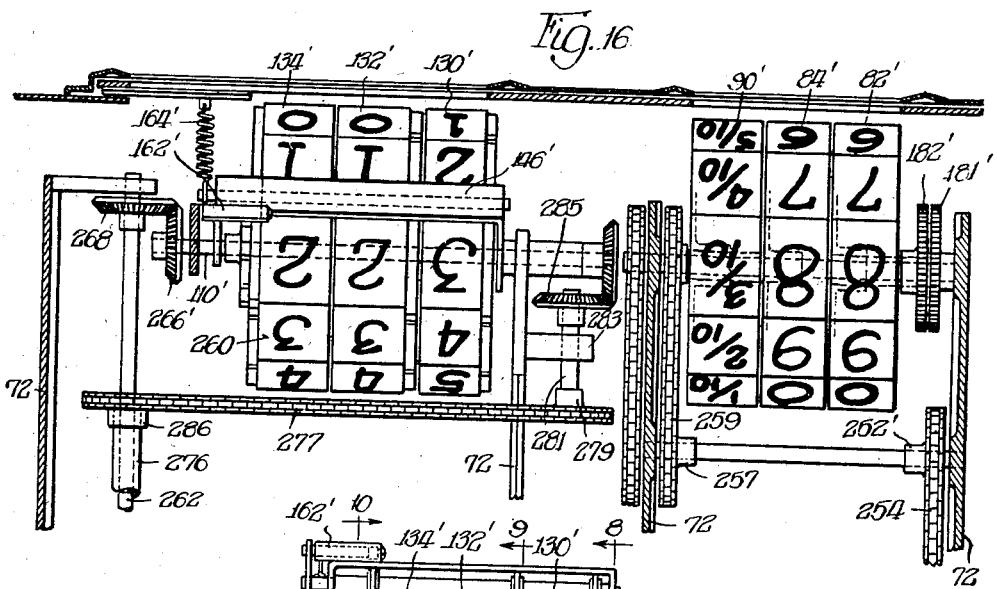
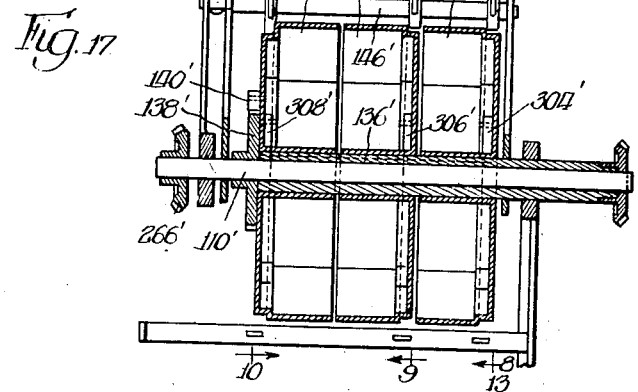
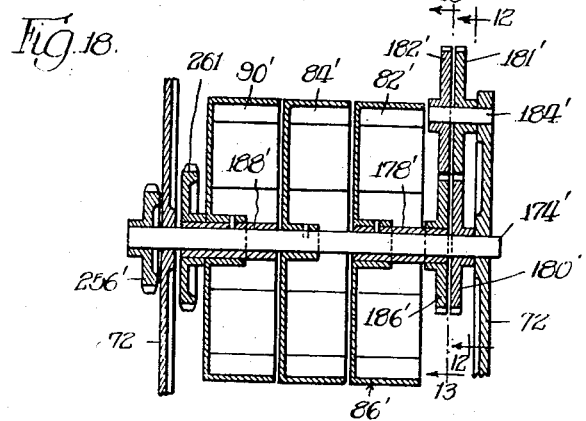
Inventor
Frank V. Mayo,
By Wilkinson Huxley Byron & Knight
Attorneys Patented Apr. 30, 1940

2,198,879

UNITED STATES PATENT OFFICE 2,198,879

LIQUID DISPENSING APPARATUS

Frank V. Mayo, Stockton, Calif., assignor to The Wayne Pump Company, Fort Wayne, Ind., a corporation of Maryland Original application June 22, 1934, Serial No. 731,987. Divided and this application May 18, 1938, Serial No. 208,526

16 Claims. (Cl. 74—348)

The present invention relates to fluid dispensing apparatuses and more particularly to mechanism including counter and indicating means and an adjustable speed variator mechanism associated therewith.

This application is a division of application Serial No. 731,987, filed June 22, 1934.

At the present time certain fluid dispensers are constructed to include counter means showing the number of units of fluid dispensed thereby, together with suitable indicator means for showing the total cost of the fluid so dispensed. The purchaser of fluid, however, is unable to determine for himself by looking at these dispensers just what price the retailer is charging per unit of fluid which he is receiving.

It is therefore an object of the present invention to provide a novel fluid dispenser including an indicator showing the unit price for the fluid dispensed which is visible to the purchaser and which cannot be reset or tampered with without exposing such change to the purchaser.

Another object of the present invention is to provide a novel fluid dispenser having a counter showing the quantity of fluid dispensed thereby, an indicator for visibly showing the price per unit of this fluid, and a counter for showing the total cost of the fluid dispensed at the unit price as indicated.

The present invention also includes as an object the idea of providing a fluid dispenser with a unit price indicator adapted to show the cost per unit in cents and also fractional values thereof. The invention also comprehends the idea of providing such a unit price indicator in a liquid dispenser, in combination with a counter for showing the quantity of fluid dispensed thereby and a counter showing the total cost to the purchaser of the amount of fluid dispensed at the unit price.

Still another object of the present invention is to provide a liquid dispenser including a novel indicator means comprising a unit price indicator having indicia of different characteristics, in combination with a total cost counter and separate speed variating means which may be set in accordance with each of the indicia of different characteristics of the unit price indicator and which in turn operates a total cost counter in accordance with the setting of the unit price indicator.

Still another object of the present invention is to provide novel driving means between a plurality of speed variator means and the total price counter whereby the total price counter is operated as a result of the accumulative operative movements of each of the variator means.

Still a further object of the present invention is to provide a novel liquid dispenser including a plurality of counter means and indicator means, and speed variating means so associated with said means that one of the counter means is operated in accordance with the setting of said indicator means. Further the invention includes the idea of rendering the speed variator means inoperative before it is possible to reset counter and indicator means of said dispenser. In the specific embodiment selected to illustrate the invention, such means is associated with a closure member of the casing for the dispenser which is operated upon opening of the closure member for access to the resetting mechanism and for rendering the speed variating means inoperative.

The invention still further includes the idea of providing a device having counter and indicator means provided with suitable means for rendering speed variating means associated therewith inoperative during the setting or resetting of said indicator means.

The present invention also includes within the purview of the same a device provided with counter and indicator means which has means provided with indicia of different characteristics each of which means controls a separate speed variator, and wherein said counter means is operated in accordance with the accumulative operative movements of the speed variators.

Other objects, features, capabilities and advantages are comprehended by the invention as will later appear and as are inherently possessed thereby.

Referring to the drawings:

Figure 1 is a view in elevation of a fluid dispensing apparatus made in accordance with the present invention, having parts shown in cross-section to disclose various elements thereof more in detail;

Figure 2 is a fragmentary view in vertical cross-section taken through the fluid dispenser of Figure 1 of the drawings and showing the counter mechanism therefor more in detail;

Figure 3 is a fragmentary horizontal cross-sectional view through the dispenser of Figure 1 of the drawings and showing the counter mechanism more in detail;

Figure 4 is a fragmentary vertical cross-sectional view of the combined indicator and counter mechanism shown in Figure 3 of the drawings;

Figure 5 is a view in cross-section taken in the plane represented by line 5—5 of Figure 3 of the drawings;

Figure 6 is a cross-sectional view taken in the plane represented by line 6—6 of Figure 5 of the drawings;

Figure 7 is a fragmentary view in cross-section of the total cost counter mechanism;

Figure 8 is a sectional view taken in the plane represented by line 8—8 of Figures 7 and 17 of the drawings;

Figure 9 is a sectional view taken in the plane represented by line 9—9 of Figures 7 and 17 of the drawings;

Figure 10 is a sectional view taken in the plane represented by line 10—10 of Figures 7 and 17 of the drawings;

Figure 11 is a fragmentary view in vertical cross-section of the unit price indicator of the dispenser mechanism;

Figure 12 is a sectional view taken in the plane represented by line 12—12 of Figures 11 and 18 of the drawings;

Figure 13 is a sectional view taken in the plane represented by line 13—13 of Figures 11 and 18 of the drawings;

Figure 14 is a fragmentary horizontal cross-sectional view through the dispenser of Figure 1 of the drawings, disclosing the reset mechanism for indicator 86 and counter 112;

Figure 15 is a fragmentary vertical cross-sectional view of the dispenser of Figure 1 of the drawings taken in the plane represented by line 15—15 of Figure 14, disclosing the reset mechanism in elevation;

Figure 16 is a fragmentary horizontal cross-sectional view through the dispenser of Figure 1 of the drawings, disclosing the duplicate unit price indicator and total cost counter;

Figure 17 is a fragmentary view in cross-section of the duplicate total cost counter mechanism; and Figure 18 is a fragmentary view in vertical cross-section of the duplicate unit price indicator of the dispenser mechanism.

Referring now more in detail to the drawings, an embodiment selected to illustrate the present invention is shown in connection with a liquid dispenser having a casing 2 supported upon a pedestal 4, within which casing is disposed a motor 6 adapted to operate a pump 8 through a belt 10, which pump communicates through an intake 12 having its lower end disposed within a container or receptacle 14 for holding a supply of liquid to be dispensed through the dispenser. The pump 8 is controlled through the motor 6, which may be operated by means of a suitable switch controlled or operated by a switch operating member 16 adjacent the hose hook or support. The outlet side of the pump 8 is connected to the pipe 18 which is connected to the inlet side of a meter 20 which may be of the piston displacement type or any suitable type accurately measuring the amounts of liquid supplied thereto and passing therethrough, the measured liquid flowing through the pipe 22 to the sight gauge 24 and being dispensed through the hose 26 and the hand-operated nozzle 28. The nozzle as shown in Figure 1 of the drawings is supported on the hook preventing operation of the switch operating member 16, in which position the motor 6 is inoperative. In order to operate the motor, it is necessary to move the nozzle 28 from the hook and to raise the operating member 16, and it is necessary for measuring operation of the meter that the valve in nozzle 28 be operated to permit the flow of liquid therethrough.

The meter 20 operates a shaft 30, which shaft, as disclosed in Figure 2 of the drawings, has its upper end journaled within a housing 32 enclosing suitable gearing, generally referred to as 34, for operating pointers 36 and 38 on one side of the dispenser and pointers 40 and 42 on the opposite side of the dispenser of quantity counters generally designated as 33, these pointers moving over the face of dials 44 and 46, respectively, having certain indicia indicating the quantity of liquid dispensed at any given time through the nozzle 28, these pointers and dials being enclosed within the casing and being visible through the transparent windows 48 and 50.

In addition to the counter means for disclosing the amount of liquid dispensed by the apparatus, the present invention includes the idea of providing novel indicating mechanism for disclosing through windows 52 in the casing 2 the price per unit of the liquid dispensed, and to also disclose through windows 54 in casing 2 the total cost of the amount of fluid dispensed as indicated by the quantity counter computed at the unit price as shown through windows 52.

Such means in the present embodiment is operated through a shaft 56 suitably journaled in the housing 32 and having a gear 58 meshing with one of the gears of the gear mechanism 34. The shaft 56 rotates one full rotation for each unit of liquid dispensed, as for example, one gallon, and is provided at its upper end with a bevel gear 60 meshing in 1 to 1 ratio with a beveled gear 62. The beveled gear 62 is mounted upon a shaft 64 upon which a spur gear 66 is mounted so that spur gear 66 operates in a 1 to 1 ratio with beveled gears 62 and 60. This spur gear 66 meshes in 1 to 1 ratio with a pinion 68 which is mounted upon shaft 70 having its ends mounted for rotation in frame 72 of the combined indicator and counter mechanism. The shaft 56 is also provided adjacent its upper end with a worm gear 74 meshing in 1 to 50 ratio with a worm gear 76 mounted upon a shaft 78 having its ends suitably journaled in the frame 72 in opposite relation to the shaft 70. Mounted upon the shaft 70 is a gear cone 80 which consists of thirty gears each advancing in circumference by the pitch of two teeth, the smallest gear having ten teeth and the largest gear having sixty-eight teeth. This gear cone is operatively associated through mechanism to be hereinafter more fully described, with a dime drum 82 and cent drum 84 of the unit price or rate indicator, generally referred to as 86. Mounted upon shaft 78 is a gear cone 88 which consists of nine gears each advancing in circumference by a pitch of ten teeth, the smallest gear having ten teeth and the largest gear having ninety teeth. This gear cone 88 is operatively associated through suitable mechanism to be hereinafter described, with the fraction drum or wheel 90 of the unit price indicator 86.

Referring to Figure 1 of the drawings, it will be noted that the price per unit of liquid dispensed by the apparatus, as shown by indicator 86 through window 52, is 33$\frac{8}{10}$¢. The counter means 33 shows that not quite three units have been dispensed, and the total cost counter shows that the total cost of the quantity of fluid at the unit price is 99¢. The indicator 86 and the mechanism associated therewith and shown in Figures 2, 3, 4 and 7 to 13 inclusive of the drawings, have been set for the unit price of $33\frac{8}{10}$¢, and it is to be understood that the following description of the combined indicator and counter mechanism is made in view of this particular setting.

The rotation of shaft 56 is transferred to the pinion 68 in a 1 to 1 ratio, and this movement is transferred through shaft 70 to the gear cone 80. The gears of this cone are adapted to mesh with gear train 92 having a gear 94 meshing with an idler gear 96, which in turn meshes with a gear 98, rotation of gear 94 being transferred through gear 96 to gear 98 in a 1 to 1 ratio. The gear train 92 is slidably mounted upon a non-circular shaft 100 passing through the hub of gear 98. As shown in Figure 3 of the drawings, gear 94 is in mesh with the next to the largest gear, which has sixty-six teeth. Gear 94 is therefore rotated in a 66 to 20 ratio, it being understood that gear 94 has twenty teeth, this ratio being a 3.3 ratio so that for each unit dispensed by the device, gear 98 is rotated 3.3 times. This rotation of gear 98 is transmitted to a beveled gear 102 mounted at one end of the shaft 100 and is disposed within a planetary differential 103 having a housing 104, this gear 102 rotating 3.3 revolutions per unit of fluid discharged by the device and meshing with idler gears 105 and 107 mounted on shafts 109 and 111, respectively, which are fixed to housing 104. Reduced by the planetary action of this planetary differential to one-half this number of revolutions the rotation of gear 102 is transmitted to the spur gear 106 mounted on the differential housing 104 so that this spur gear 106 rotates 1.65 turns per unit of discharged liquid. This spur gear 106 is in meshing relation in a 2 to 1 ratio with a gear 108 mounted on the shaft 110 of the total cost counter, generally referred to as 112. It will therefore be seen that shaft 110 of this counter means rotates 3.3 turns per unit of liquid dispensed by the apparatus. It will therefore be quite apparent that 3.3 revolutions of shaft 110 are in accordance with the 33¢ indicated on the unit price indicator 86.

It will be noted, however, that the unit price is not 33¢ but $33\frac{8}{10}$¢. Additional movement to shaft 110 is therefore necessary, and such movement is effected through the speed variator which includes the gear cone 88. Inasmuch as the smallest gear of this gear cone 88 has ten teeth and the largest has ninety teeth, and shaft 78 rotates in a 1 to 50 ratio with rotation of shaft 56, it will be seen that each one of these gears represents $\frac{1}{10}$¢ additional movement to the shaft 110. Inasmuch as the unit price is $33\frac{8}{10}$¢, a train of gears 114 corresponding to the train of gears 92 is in operable association with the next to the largest gear of gear cone 88, this gear having eighty teeth so that movement of gear 116 of this gear train is in a ratio of 4 to 1 with the next to the largest gear, and inasmuch as the gear cone 88 is advancing $\frac{1}{50}$ revolution for each unit dispensed by the apparatus, gear 116 rotates $\frac{8}{100}$ revolution for each revolution of gear 60. Gear 116 is mounted upon a non-circular shaft 118 in a similar manner to gear 98, this shaft 118 being suitably journaled adjacent its ends in the frame 72 of the combined indicator and counter mechanism. This shaft 118 extends within the differential housing 104 and has mounted upon its end a beveled gear 120, movement of this beveled gear 120 being transmitted through the idler differential gears 105 and 107 to the housing 104 to increase the speed of this housing $\frac{8}{100}$ revolution. The speed of the gear 106 is therefore equal to the speed of 1.65 revolutions caused by the rotation of beveled gear 102 plus the speed of $\frac{4}{100}$ revolution caused by the rotation of bevel gear 120 which would equal 1.69 revolutions per unit of liquid dispensed by the apparatus. Inasmuch as the speed of rotation of housing 104 is transmitted in 2 to 1 ratio through the smaller pinion 108, rotation of the shaft 110 is equal to 3.38 revolutions for each unit of fluid dispensed. This movement of the shaft is therefore in accordance with the $33\frac{8}{10}$¢ setting of the unit price indicator 86.

The total price counter 112 comprises three drums 130, 132 and 134 representing dollar, dime and cent values, respectively, each of these drums having suitable indicia on the periphery thereof which are exposed through the opening 54 in the casing, these drums being rotatably mounted on a continuous bushing or hollow shaft 136. Each of these drums is therefore free to rotate independently of shaft 110 and the bushing 136 in a clockwise direction, it being provided that one revolution of the cent drum 134 will advance the dime drum 132 $\frac{1}{10}$ revolution and likewise under continuous clockwise motion as liquid is being dispensed one revolution of the dime drum will advance the dollar drum 130 $\frac{1}{10}$ revolution. The cent drum 134 is rotated in accordance with the shaft 110 through a ratchet wheel 138 mounted thereon and a pawl 140 connected to the side of the cent drum and pressed into engagement with ratchet wheel 138 by spring 141.

At the side of each drum is provided a depressed portion having means for advancing the drums as indicated. The cent drum has a depression or notch 142 adapted to engage a pawl 144 non-rotatably mounted upon the shaft 146 of an oscillatable frame 148 which is mounted upon shaft 110. The notch 142 is so located that when the drums 130, 132 and 134 have been set at zero for the beginning of each transaction, the clockwise rotation of the drum 134 through $\frac{9}{10}$ revolution will be permitted before pawl 144 engages in notch 142. Any further rotation permits the pawl to drop into the notch 142 to a depth depending upon the position of similar pawls 150 and 152 associated with the dime and dollar drums 132 and 130, respectively. Drum 132 is provided with ten notches 154 spaced equally about the periphery thereof, the tenth notch 156 being deeper than the others but of less depth than notch 142 on the cent drum 134. The dollar drum 130 is also provided with ten notches 158 each of equal depth and disposed at equal distances about the periphery thereof. The position of the notch 156 is such that it is not engaged by the pawl 150 until the drum has completed $\frac{9}{10}$ revolution. It will therefore be seen that when the cent drum 134 has advanced $\frac{9}{10}$ revolution and the pawl 144 has engaged with notch 142, it will permit the next pawl 150 to drop into and engage the first notch 154 on the dime drum but will not permit the pawl 152 of the dollar drum 130 to lower sufficiently to engage therein. In accordance with the construction of these drums and their associated pawls, it will be seen that for $\frac{1}{10}$ revolution, the cent and dime drums will travel together due to rotation of shaft 110 until the oscillatable frame 148 is moved into a position so that the trip arm 160 of pawl 144 engages with roller 162 to trip the pawls to free them from their respective notches so that the dime drum 132 ceases to advance beyond the $\frac{1}{10}$ revolution after the cent drum has made a complete revolution. The cent drum, upon further operation of the device, will advance another ⁷⁄₁₀ revolution to permit pawl 148 to drop into notch 142 and pawl 150 to drop into the next notch 154 for moving the dime drum an additional ¹⁄₁₀ revolution. This operation continues during the dispensing of fluid from the device and it will be seen that the oscillatable frame 148 for tripping of the pawls is moved into its original position through a coil spring 164.

When the cent drum has been caused to rotate nine full revolutions and the dime drum has been rotated thereby ⁹⁄₁₀ of a complete revolution, thus registering 99¢, further rotation causes the cent pawl 144 and the dime pawl 150 to drop into and engage their respective notches 142 and 156 to the full depth, thus permitting the pawl 152 to engage the first notch on its drum, at which time further movement of the cent drum causes all three drums to be advanced the necessary ¹⁄₁₀ revolution to register $1.00. The trip arm 160 at this time will engage the roller 162 to release the pawls to prevent further rotation of the dime and dollar drums 132 and 130 and to permit a continued advance of the cent drum 134.

As shown in Figures 8, 9 and 10, the pawls 148, 150 and 152 are spring-pressed into engagement with the periphery of their respective drums by means of the leaf springs 166. Disposed immediately below each of the drums 130, 132 and 134 is a pawl 170 spring-pressed into engagement therewith by means of a leaf spring 172 to prevent the drums from spinning during operation thereof, the pawls 170 and springs 172 being mounted on the frame member 168.

As previously described, the unit or prevailing price indicator 86 comprises drums 82, 84 and 90. Drums 82 and 84 are provided with suitable indicia to represent dimes and cents, respectively, while drum 90 has suitable indicia on the periphery thereof to represent fractions of a cent. The unit price indicator 86 is provided with suitable means whereby the drums 82, 84 and 90 may be reset to any desired position to represent the unit price of the liquid dispensed. This indicator comprises the shaft 174 having the knob 176 mounted thereon at one end, this shaft being suitably mounted in frame 72 of the indicator mechanism. The cent drum 84 is directly mounted upon this shaft 174, while the dime drum 82 is mounted upon a bushing or hollow shaft 178. Upon the shaft 174 is mounted a mutilated gear 180 having but two teeth so disposed as to engage corresponding teeth on a driven gear 181 having ten stops mounted upon shaft 184 secured to frame 72. The two gears are always operative because the periphery of the mutilated gear 180 is the pitch line of gear 181, and when the teeth of the two gears are not in mesh, this mutilated gear rotates in a circular segment of sufficient arc to cause no motion of shaft 184 except for the ¹⁄₁₀ revolution required to advance (or reverse, as the case may be) the spur gear 182 mounted upon the shaft 184 adjacent gear 181, this spur gear 182 being in mesh with a gear 186 mounted upon the hollow shaft or bushing 178. It will therefore be seen that the dime drum 82, as well as the cent drum 84, will be moved as desired through the mechanism disclosed when the knob 176 is rotated, it being understood that movement of drum 82 is in a ratio of 1 to 10 with movement of drum 84 because of gears 180 and 181.

The fractions drum 90 is mounted upon a bushing or hollow shaft 188 which is mounted upon shaft 174 and is provided with a hand knob 190 whereby the fractions drum 90 may be set independently of the cent and dime drums.

Each of the train of gears 92 and 114 of the speed variating means is moved into association with a suitable gear of the gear cones 80 and 88, respectively, so that the total cost counter 112 will correctly give the cost of the quantity of fluid designated by the quantity counter 33 at the unit price as shown on the unit price indicator 86. The trains of gears 92 and 114 are moved into association with a selected gear through the operation of knobs 190 and 176, respectively. Movement of the shaft 174 is transmitted to a gear 192 fixed thereto and which meshes with a pinion 194 mounted on a spiral shaft 196. Secured to the hub of gear 98 is an arm 198 formed with a hub 200 threadedly mounted on this shaft so that this hub 200 is moved along the shaft upon rotation thereof through gears 194 and 192, shaft 174 and knob 190. The gearing between the dime and cent drums 82 and 84 and the spiral shaft 196 and the pitch of the threads on the shaft is such as to move the hub 200 longitudinally of the shaft 196 exactly equal in amount so that gear 94 will mesh with the proper gear on gear cone 80 to operate the total cost counter 112 in accordance with quantity counter 33 at the unit price as indicated by the indicia readable on the dime and cent drums.

Rotation of the knob 190 is transmitted through a gear 201 mounted on the hollow shaft or bushing 188, which gear is in mesh with a pinion 202 mounted on a spiral shaft 204 corresponding to the spiral shaft 196. The gear train 114 is provided with an arm 206 having a hub 208 threadedly mounted on the shaft 204 for longitudinal movement in respect thereto. The gearing between the fractions drum 90 and spiral shaft 204 and the pitch of the threads on the shaft 204 is such that the gearing 114 will be in operative association with the proper gear of the gear cone 88 to give additional readings to the total cost counter in accordance with the unit price as indicated by the indicia readable on the fraction drum 90.

The present invention also includes suitable means whereby the trains of gears 92 and 114 are disengaged from the selected gears of the gear cones 80 and 88, respectively, during the setting of the indicator 86 by way of the knobs 176 and 190. Such means in the present embodiment comprises carriages 210 and 212 oppositely disposed in relation to the gear trains 92 and 114, respectively, which are mounted upon the frame 72 by brackets such as 214 and guided at the top thereof by brackets, such as 216. Each of the brackets has a pin 218 extending through a slot 220 at the top and bottom of the carriages permitting a horizontal sliding movement of approximately ¾″ to the left for the carriage 210 and about ¾″ to the right for carriage 212. Between the carriages 210 and 212 is a lever arm 222 pivoted at 224 to the counter frame 72. This lever arm at its lower end is pivoted as at 226 to the carriage 210 and at its upper end as at 228 to the carriage 212. The carriage 210 is provided with a slot 230 disposed in parallel relation to the slope formed by the cone of gears 80 which is adapted to slidably engage the arm 232 extending from the train of gears 92 at the mounting therefor and the gear 98 on the shaft 100. The carriage 212 is similarly formed with slot 234 disposed parallel to the slope formed at the cone of gears 80 which is adapted to receive the arm 236 similar to the arm 232 which extends from the gear train 114 at the mounting for the gear 116 which is mounted upon shaft 118.

As more clearly shown in Figure 3 of the drawings, the rate changing knobs 190 and 176 are disposed within the casing 2 which is formed with a closure member 238 pivoted as at 240 which must be opened in order to gain access to the rate changing knobs 176 and 190. This closure member or door 238 is formed with a bracket 242 pivoted as at 244 to a link 246, which link is pivoted as at 248 to an extension 250 of the carriage 212. It will be seen, therefore, that when the door 238 is opened, the lever 246 is moved to the right as shown in Figure 3 causing movement of the carriage 212 to the right and thereby depressing the extension or arm 236 by means of its engaging relation with the slot 234. This depressing of arm 236 causes pivotal movement of the train of gears 114 about its mounting on the shaft 118 to move its outer gear out of meshing engagement with any of the selected gears of the gear cone 88. Movement of the carriage 212 to the right, as shown in Figures 3 and 4, causes lever arm 222 to pivot about its pivot point 224 to move carriage 210 to the left. Movement of this carriage 210 to the left depresses arm 232 riding in slot 230 causing movement of the train of gears 92 about its mounting on the shaft 100 to effect disengagement of gear 94 from its meshing relation with any of the selected gears of the gear cone 80. After the door has been opened, rate changing knobs 176 and 190 may be manipulated to effect movement of gear trains 92 and 114 along their respective shafts 100 and 118, as previously described, so that these gear trains may be moved into proper meshing relation with any of the selected gears or gear cones 80 and 88. After these gear trains have been moved as indicated, the door 238 is moved into closed position which, through link 246 and lever arm 222, effect movement of carriages 210 and 212 in the opposite direction to allow gear trains 92 and 114 to be moved into meshing relation with the selected gears.

For the purposes of illustrating the present invention, the drawings show indicator 86 and counter 112 which are visible through windows 52 and 54 from one side of the meter. The present invention comprehends the idea of providing a duplicate indicator and counter corresponding to indicator 86 and counter 112 on the opposite side of the dispenser, as shown in Figure 2 of the drawings. It will of course be appreciated that for this duplicate indicator and counter it is only necessary to provide the drums therefor together with the associated mechanism for properly rotating these drums in accordance with the settings of the indicator 86 and counter 112.

The duplicate unit price indicator, generally referred to as 86', and shown in Figures 16 and 18 on the opposite side of the casing 2, comprises the dime, cent and fraction drums 82', 84' and 90', the drums 82' and 90' being disposed in reversed position from the drums 82 and 90 because of their location on the opposite side of the casing 2. These drums are set by knobs 176 and 190 simultaneously with the setting of drums 82, 84 and 90. As shown in Figure 18, drum 18' is mounted on shaft 174' which is mounted in the frame 72 and has a sprocket 256' mounted on one end thereof which operates in accordance with sprocket 256 of indicator 86 through the chain 258. Mounted adjacent the other end of shaft 174' are gears 180' and 186' associated with gears 181' and 186 mounted on stub shaft 184' in the same manner as similar gears of indicator 86 of Figure 11 of the drawings, the same being reversed, however, and the gear 186' cooperating with sleeve 178' to move the dime drum 82'.

The setting of the duplicate fractions drum 90' is effected through knob 190, sprocket 252 and chain 254 which drives sprocket 252'. The sprocket 252', as shown in Figure 16, is mounted adjacent one end of shaft 255 which is journaled in frame 72 and has a sprocket 257 mounted thereon adjacent its opposite end. Sprocket 257, through the chain 259, drives sprocket 261 which is mounted upon sleeve 188' upon which the fraction drum 90' is mounted upon shaft 174'. It will therefore be seen that the duplicate unit price indicator 86' is operated through the mechanism above described in accordance with the unit price indicator 86.

It will be observed that operation of the total cost indicator 112 is effected solely by rotation of the shaft 110 as shown in Figure 7 of the drawings and as described in connection with the structure shown therein. Rotation of this shaft is transferred to the cent drum 134 which in turn effects proper movement of drums 132 and 130, as heretofore described. A duplicate total cost counter, generally designated as 260, and shown in Figures 16 and 17 on the opposite side of the casing 2, comprises the dollar, dime and cent drums 130', 132' and 134', the drums 130' and 134' being disposed in reversed position from the drums 130 and 134. The drums 130', 132' and 134' are mounted upon sleeve 136' loosely mounted on shaft 110' and the mechanism for operating the dollar and dime drums from the cent drum corresponds to the mechanism of counter 112 and the elements of such mechanism in Figures 16 and 17 are referred to by similar reference numerals with the added mark to indicate that such elements are part of the duplicate counter mechanism, it being further understood that the elements are in reversed position. The drums 130', 132' and 134' of the duplicate counter are operated by a shaft 262 mounted in frame 72 and which is rotated in accordance with shaft 110 through a beveled gear 264 secured to shaft 262 and which meshes with beveled gear 266 fixed to shaft 110. At the other end of the shaft is a beveled gear 268 meshing with a beveled gear 266' mounted on the shaft 110'.

Indicators 112 and 260 are reset by shafts 274 and 276 which are hollow and mounted upon the shaft 262. Hollow shaft 274 has a beveled gear 278 meshing with a beveled gear 280 mounted upon the bushing or hollow shaft 136 of the indicator 112. At the other end of this hollow shaft 274 is a beveled gear 282 meshing with a beveled gear 284. Hollow shaft 276 has a beveled gear 286 at one end which, through a chain 277, drives sprocket 279 fixed to stub shaft 281. The stub shaft is journaled in bearing 283 of frame 72 and has beveled gear 285 secured to its other end which meshes with beveled gear 280'. The gear 280' is mounted on sleeve 136' and corresponds to gear 280 of the counter 112. Rotation of sleeve 136' effects a resetting of the drums 130', 132' and 134' in the same manner as a resetting of drums 130, 132 and 134 is accomplished, as will be hereinafter described. To the inner end of shaft 276 is secured a beveled gear 290 which also meshes with beveled gear 284. Beveled gear 284 is mounted upon shaft 292 through a clutch 294, this shaft 292 being operated by the reset shaft for the quantity indicator 33. Rotation of shaft 292 during the resetting operation effects rotation of hollow shafts 274 and 276 which in turn causes rotation of the beveled gears 280 and 288.

As shown in Figures 7 to 10 inclusive of the drawings, which represent the structure provided in each of the total cost indicators, the bushing 136 is provided with a continuous notch 296 which is adapted to communicate with slots 298, 300 and 302 of the drums 130, 132 and 134, respectively. Disposed adjacent slots 298, 300 and 302 and connected to drums 130, 132 and 134 are pawls 304, 306 and 308, each of which is spring-pressed as by means of leaf springs 310, these pawls being adapted to project through slots 298, 300 and 302, respectively, to engage with the continuous notch 296. It will therefore be apparent that upon counter-clockwise rotation of hollow bushing 136 through the movement of beveled gear 280, this continuous notch 296 will come into engagement successively with pawls 308, 306 and 304 to return these drums to their zero setting, the counter-clockwise movement of the drums being stopped by a pawl 312 spring-pressed into engagement with the dollar drum 130 as by means of spring 314 and which engages with the stop 316. The clutch 294 provides for slippage so that after the drums of the total price counters are returned to zero setting, any further rotation of shaft 292 will not affect movement thereof.

If it be desired, a totalizer showing the total cost of the liquid dispensed may be provided. This totalizer may be of conventional design and may be enclosed within the casing 2 having a shutter 318 which may be opened when desired to obtain the reading thereof. This totalizer is driven by a gear 320 engaging the external differential gear 106 driving the beveled gears 322 and 324 and thus rotating shaft 326 attached to the totalizer.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. In a price selecting device for a liquid dispensing apparatus, the combination of a gear cone, a train of gears, a shaft for said train of gears, said train of gears being pivotally and slidably mounted on said shaft whereby the same is selectively driven by any of the gears of said gear cone, an arm fixed to said gear train, a slidable carriage having a track cooperating with said arm for pivotally moving said gear train about said shaft to disengage one of the gears thereof from a selected gear of said gear cone, and means for sliding said gear train on said shaft.

2. In a price selecting device for a liquid dispensing apparatus, the combination of a gear cone, a train of gears, a shaft for said train of gears, said train of gears being pivotally and slidably mounted on said shaft whereby the same is selectively driven by any of the gears of said gear cone, an arm fixed to said gear train, a slidable carriage having a track disposed substantially parallel to the slope of said gear cone and cooperating with said arm for pivotally moving said gear train about said shaft to disengage one of the gears thereof from a selected gear of said gear cone, and means for sliding said gear train on said shaft.

3. In a price selecting device for a liquid dispensing apparatus, the combination of a casing having a closure member, a gear cone therein, a train of gears, a shaft for said train of gears, said train of gears being pivotally and slidably mounted on said shaft whereby the same is selectively driven by any of the gears of said gear cone, an arm fixed to said gear train, a slidable carriage having a track cooperating with said arm for pivotally moving said gear train about said shaft to disengage one of the gears thereof from a selected gear of said gear cone, means connecting said closure member with said carriage whereby said carriage is moved upon opening said closure member, and means for sliding said gear train on said shaft.

4. In a price selecting device for a liquid dispensing apparatus, the combination of a casing having a closure member, a gear cone therein, a train of gears, a shaft for said train of gears, said train of gears being pivotally and slidably mounted on said shaft whereby the same is selectively driven by any of the gears of said gear cone, an arm fixed to said gear train, a slidable carriage having a track disposed substantially parallel to the slope of said gear cone and cooperating with said arm for pivotally moving said gear train about said shaft to disengage one of the gears thereof from a selected gear of said gear cone, means connecting said closure member with said carriage whereby said carriage is moved upon opening said closure member, and means for sliding said gear train on said shaft.

5. In a price selecting device for a liquid dispensing apparatus, the combination of a rotatable member, a gear cone, a train of gears, a shaft for said train of gears, said train of gears being pivotally and slidably mounted on said shaft whereby the same is selectively driven by any of the gears of said gear cone, arms extending from said gear train, a slidable carriage having a track cooperating with one of said arms for pivotally moving said gear train about said shaft to disengage one of the gears thereof from a selected gear of said gear cone, and means between said rotatable member and the other of said arms for sliding said gear train along the shaft therefor into any desired position in accordance with the movement of said rotatable member.

6. In a price selecting device for a liquid dispensing apparatus, the combination of a rotatable member, a gear cone, a train of gears, a shaft for said train of gears, said train of gears being pivotally and slidably mounted on said shaft whereby the same is selectively driven by any of the gears of said gear cone, arms extending from said gear train, a slidable carriage having a track disposed substantially parallel to the slope of said gear cone and cooperating with one of said arms for pivotally moving said gear train about said shaft to disengage one of the gears thereof from a selected gear of said gear cone, and means between said rotatable member and the other of said arms for sliding said gear train along the shaft therefor into any desired position in accordance with the movement of said rotatable member.

7. In a price selecting device for a liquid dispensing apparatus, the combination of a rotatable member, a gear cone, a train of gears, a shaft for said train of gears, a threaded shaft disposed adjacent said first-named shaft, said train of gears being pivotally and slidably mounted on said first-named shaft whereby the same is selectively driven by any of the gears of said gear train, arms extending from said gear train, a slidable carriage having a track cooperating with one of said arms for pivotally moving said gear train about the shaft therefor to disengage one of the gears thereof from a selected gear of said gear cone, the other of said arms having a threaded hub mounted on said threaded shaft, and means between said rotatable member and said threaded shaft for sliding said gear train along the shaft therefor into any desired position in accordance with the movement of said rotatable member.

8. In a price selecting device for a liquid dispensing apparatus, the combination of adjacently disposed gear cones, a train of gears associated with each of said gear cones, a shaft for each of said trains of gears, said trains of gears being pivotally and slidably mounted on the shafts therefor whereby the same are selectively driven by selected gears on said gear cones, an arm fixed to each of said gear trains, adjacently disposed slidable carriages each having a track cooperating with an arm of a gear train for pivotally moving said gear trains about the shafts therefor to disengage the gears thereof in engagement with selected gears of said gear cones, means interconnecting said carriages, and means for moving said carriages.

9. In a price selecting device for a liquid dispensing apparatus, the combination of adjacently disposed gear cones, a train of gears associated with each of said gear cones, a shaft for each of said trains of gears, said trains of gears being pivotally and slidably mounted on the shafts therefor whereby the same are selectively driven by selected gears on said gear cones, an arm fixed to each of said gear trains, adjacently disposed slidable carriages each having a track cooperating with an arm of a gear train for pivotally moving said gear trains about the shafts therefor to disengage the gears thereof in engagement with selected gears of said gear cones, a pivotally mounted lever pivotally connected adjacent its ends to said carriages, and means for moving one of said carriages whereby the other is moved simultaneously through said lever.

10. In a price selecting device for a liquid dispensing apparatus, the combination of a casing, a closure member therefor, adjacently disposed gear cones in said casing, a train of gears associated with each of said gear cones, a shaft for each of said trains of gears, said trains of gears being pivotally and slidably mounted on the shafts therefor whereby the same are selectively driven by selected gears on said gear cones, an arm fixed to each of said gear trains, adjacently disposed slidable carriages each having a track cooperating with an arm of a gear train for pivotally moving said gear trains about the shafts therefor to disengage the gears thereof in engagement with selected gears of said gear cones, means interconnecting said carriages, and means connected between one of said carriages and said closure member whereby said carriages are moved upon movement of said closure member.

11. In a price selecting device for a liquid dispensing apparatus, the combination of a casing, a closure member therefor, adjacently disposed gear cones in said casing, a train of gears associated with each of said gear cones, a shaft for each of said trains of gears, said trains of gears being pivotally and slidably mounted on the shafts therefor whereby the same are selectively driven by selected gears on said gear cones, an arm fixed to each of said gear trains, adjacently disposed slidable carriages having a track cooperating with an arm of a gear train for pivotally moving said gear trains about the shafts therefor to disengage the gears thereof in engagement with selected gears of said gear cones, a pivotally mounted lever pivotally connected adjacent its ends to said carriages, and means connected between one of said carriages and said closure member whereby said carriages are moved upon movement of said closure member.

12. In a price selecting device for a liquid dispensing apparatus, the combination of adjacently disposed rotatable members, adjacently disposed gear cones, a train of gears associated with each of said gear cones, a shaft for each of said trains of gears, said trains of gears being pivotally and slidably mounted on the shafts therefor whereby the same are selectively driven by selected gears on said gear cones, an arm fixed to each of said gear trains, adjacently disposed slidable carriages each having a track cooperating with an arm of a gear train for pivotally moving said gear trains about the shafts therefor to disengage the gears thereof in engagement with selected gears of said gear cones, means interconnecting said carriages, means for moving said carriages, means between one of said rotatable members and one of said train of gears and means between the other of said rotatable members and the other of said train of gears for sliding said trains of gears along the shafts therefor in accordance with the movement of said rotatable members.

13. In a price selecting device for a liquid dispensing apparatus, the combination of a shaft, a sleeve rotatably mounted thereon, adjacently disposed gear cones, a train of gears associated with each of said gear cones, a shaft for each of said trains of gears, said trains of gears being pivotally and slidably mounted on the shafts therefor whereby the same are selectively driven by selected gears on said gear cones, an arm fixed to each of said gear trains, adjacently disposed slidable carriages each having a track cooperating with an arm of a gear train for pivotally moving said gear trains about the shafts therefor to disengage the gears thereof in engagement with selected gears of said gear cones, means interconnecting said carriages, means for moving said carriages, means disposed between said first-named shaft and one of said trains of gears and means between said sleeve and the other of said trains of gears for sliding said trains of gears along the shafts therefor in accordance with the movement of said sleeve and first-named shaft.

14. In a price selecting device for a liquid dispensing appartus, the combination of adjacently diposed rotatable members, adjacently disposed gear cones, a train of gears associated with each of said gear cones, a shaft for each of said gear cones, a shaft for each of said trains of gears, said trains of gears being pivotally and slidably mounted on the shafts therefor whereby the same are selectively driven by selected gears on said gear cones, threaded shafts disposed adjacent the shafts for said trains of gears, each of said trains of gears having arms extending therefrom, adjacently disposed slidable carriages each having a track cooperating with an arm of each of said trains of gears for pivotally moving said trains of gears about the shafts therefor to disengage the gears thereof in engagement with selected gears of said gear cones, means interconnecting said carriages, means for moving said carriages to effect movement of said trains of gears, one of the arms of each of said trains of gears being provided with hubs threadedly mounted on said threaded shafts, means between said threaded shafts and rotatable members for sliding said trains of gears along the shafts therefor in accordance with the movement of said rotatable members.

15. In a price selecting device for a liquid dispensing apparatus, the combination of a shaft, a sleeve mounted thereon, adjacently disposed gear cones, a train of gears associated with each of said gear cones, a shaft for each of said gear cones, a shaft for each of said trains of gears, said trains of gears being pivotally and slidably mounted on the shafts therefor whereby the same are selectively driven by selected gears on said gear cones, threaded shafts disposed adjacent the shafts for said trains of gears, each of said trains of gears having arms extending therefrom, adjacently disposed slidable carriages each having a track cooperating with an arm of each of said trains of gears for pivotally moving said trains of gears about the shafts therefor to disengage the gears thereof in engagement with selected gears of said gear cones, means interconnecting said carriages, means for moving said carriages to effect movement of said trains of gears, one of the arms of each of said trains of gears being provided with hubs threadedly mounted on said threaded shafts, means between said sleeve and one of said threaded shafts and means between said first named shaft and the other of said threaded shafts for sliding said trains of gears along the shafts therefor in accordance with the movement of said sleeve and said first named shaft.

16. In a price selecting device for a liquid dispensing apparatus, the combination of a gear cone, a train of gears, a shaft for said train of gears, said train of gears being pivotally and slidably mounted on said shaft whereby the same is selectively driven by any of the gears of said gear cone, an arm fixed to said gear train, movable means for disengaging said gear train from a selected gear of said gear cone, said movable means having a slope corresponding substantially to the slope of said gear cone cooperating with said arm to hold said gear train out of engagement with said gear cone during movement, and means for moving said gear train with respect to said gear cone.

FRANK V. MAYO.

CERTIFICATE OF CORRECTION.

Patent No. 2,198,879. April 30, 1940.

FRANK V. MAYO.

It is hereby certified that error appears in the printed specification of the above numbered patent requiring correction as follows: Page 7, second column, line 1, claim 11, after the word "carriages" insert --each--; line 57, claim 14, for "appartus" read --apparatus--; line 58, same claim, for "diposed" before "rotatable" read --disposed--; and that the said Letters Patent should be read with this correction therein that the same may conform to the record of the case in the Patent Office.

Signed and sealed this 11th day of June, A. D. 1940.

(Seal)

Henry Van Arsdale,
Acting Commissioner of Patents.